United States Patent
Koyanagi (10) Patent No.: US 7,250,974 B2
(45) Date of Patent: Jul. 31, 2007

(54) IMAGE PICKUP APPARATUS WITH IMPROVED AUTO FOCUSING AND METHOD OF AUTOFOCUSING

(75) Inventor: Masakazu Koyanagi, Chiba (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 10/433,235

(22) PCT Filed: Sep. 2, 2002

(86) PCT No.: PCT/JP02/08877

§ 371 (c)(1),
(2), (4) Date: May 30, 2003

(87) PCT Pub. No.: WO03/032045

PCT Pub. Date: Apr. 17, 2003

(65) Prior Publication Data

US 2004/0150744 A1   Aug. 5, 2004

(30) Foreign Application Priority Data

Oct. 3, 2001 (JP) ............................ 2001-308084

(51) Int. Cl.
*H04N 5/232* (2006.01)
(52) U.S. Cl. ...................... 348/345; 348/370; 348/371; 348/353

(58) Field of Classification Search ................ 348/353, 348/370, 371, 345, 348, 349, 362; 396/106, 396/108, 89
See application file for complete search history.

(56) References Cited

U.S. PATENT DOCUMENTS 4,602,861 A    7/1986   Taniguchi et al. ............ 396/81

(Continued)

FOREIGN PATENT DOCUMENTS

JP            63-41818        2/1988

(Continued)

*Primary Examiner*—David Ometz
*Assistant Examiner*—Pritham Prabhakher
(74) *Attorney, Agent, or Firm*—Frommer Lawrence & Haug LLP; William S. Frommer; Thomas F. Presson (57) ABSTRACT

An image pickup apparatus for electronically photographing a still image using a photo-voltaic transducer device. The focusing position of a focusing lens is detected from the contrast of the photographed image as AF supplementary light is illuminated on the object. The focusing lens then is moved to its focusing position and the contrast of the photographed image, in both the state where the AF supplementary light is illuminated and the contrast in the state where the AF supplementary light is not illuminated, is calculated. The contrast ratio between the contrast values of the two states is estimated and the focusing position is corrected based on this ratio.

27 Claims, 5 Drawing Sheets

U.S. PATENT DOCUMENTS

| | | | |
|---|---|---|---|
| 4,696,558 A | | 9/1987 | Karasaki et al. ............. 396/104 |
| 4,737,813 A | * | 4/1988 | Ishida et al. .................. 396/93 |
| 4,908,643 A | * | 3/1990 | Tamada et al. ............... 396/82 |
| 5,569,904 A | * | 10/1996 | Meyers .................... 250/201.8 |
| 5,905,919 A | * | 5/1999 | Ide ............................. 396/121 |
| 6,426,775 B1 | * | 7/2002 | Kurokawa .................. 348/363 |
| 6,614,480 B1 | * | 9/2003 | Oda et al. ................... 348/351 |
| 6,693,673 B1 | * | 2/2004 | Tanaka et al. .............. 348/371 |
| 6,839,087 B1 | * | 1/2005 | Sato ........................... 348/362 |
| 6,850,282 B1 | * | 2/2005 | Makino et al. ............. 348/371 |
| 6,961,093 B2 | * | 11/2005 | Higuchi ...................... 348/371 |
| 7,071,986 B2 | * | 7/2006 | Kobayashi et al. ......... 348/353 |
| 2001/0019364 A1 | * | 9/2001 | Kawahara ................... 348/362 |
| 2001/0026324 A1 | * | 10/2001 | Saito et al. ................. 348/345 |
| 2001/0050719 A1 | * | 12/2001 | Kobayashi et al. ......... 348/371 |
| 2003/0133021 A1 | * | 7/2003 | Hamamura et al. ...... 348/229.1 |

FOREIGN PATENT DOCUMENTS

| | | |
|---|---|---|
| JP | 2-4207 | 1/1990 |
| JP | 6-59814 | 8/1994 |
| JP | 2000-121924 | 4/2000 |
| JP | 2001-251648 | 9/2001 |
| WO | WO0246820 A1 * | 5/2001 |

* cited by examiner

IMAGE PICKUP APPARATUS WITH IMPROVED AUTO FOCUSING AND METHOD OF AUTOFOCUSING

TECHNICAL FIELD

This invention relates to an image pickup apparatus for electronically photographing e.g., a still image using a photovoltaic transducing device, such as a CCD (Charge Coupled Device) image sensor or a C-MOS image sensor.

BACKGROUND ART

An electronic image pickup apparatus, or a so-called digital still camera, employing a CCD (Charge Coupled Device) image sensor or a C-MOS image sensor as a photo-voltaic transducer device, is found in widespread applications.

This digital still camera is routinely provided with an automatic focusing function for automatic focus setting. While there are a large variety of automatic focusing systems for a digital still camera, such a system in which, as a focusing lens is moved, an image is photographed by the CCD at each of different positions of the focusing lens, in order to search a position of the maximum contrast of the photographed image, represents a mainstream. With this system, the production cost is not that high because routine electrical image information acquisition means is used such that there is no necessity of providing a distance sensor dedicated to the automatic focusing.

In effecting such automatic focusing employing the photographed image, luminosity of the photographed image falls short under a low luminosity environment, such as a dark place, and hence the contrast cannot be detected. Thus, supplementary light, e.g., LED (Light Emitting Diode) or laser light, needs to be illuminated for automatic focusing.

Meanwhile, with the supplementary light for automatic focusing, it is customary that the wavelength of the output light shall be on the low frequency side of the visible light range. Thus, if such supplementary light is used for automatic focusing for detecting the focusing position, the supplementary light undergoes chromatic aberration with respect to the lens, which differs from that of the light reflected from the object due to the difference in the frequency response between the supplementary light and the reflected light and therefore, it is difficult to effect correct control of the focusing position.

If there is no extraneous light other than a source of the supplementary light, the focusing position can be corrected by simply adding or subtracting the offset corresponding to the chromatic aberration to or from the lens movement position. Such correction may be effective if the imaging environment is completely dark. However, under an environment where there is the extraneous light in addition to the supplementary light, it is difficult to control the focusing position correctly, even on addition of the offset, because of difference in the conditions.

DISCLOSURE OF THE INVENTION

It is therefore an object of the present invention to provide a novel image pickup apparatus whereby the above problems inherent in the conventional apparatus may be overcome.

It is another object of the present invention to provide an image pickup apparatus whereby the focusing position may be controlled correctly even in case the supplementary light is emitted under, for example, a low luminosity environment.

For accomplishing the above objects, the present invention provides an image pickup apparatus including a camera pickup unit on which is incident the imaging light from an object and which transduces the imaging light into electrical signals for photographing an image, a supplementary light illuminating unit for illuminating light on the object, and a controller for controlling the camera pickup unit and the supplementary light illuminating unit. In the image pickup apparatus, when focus processing of detecting the information pertinent to the focus position of the focusing lens, the controller operates for detecting the information pertinent to the focusing position of a focus lens in two conditions. One of the two conditions is that light is illuminated by the supplementary light illuminating unit. The other is that light is not illuminated by the supplementary light illuminating unit. The controller controls the movement position of the focusing lens based on the two information pertinent to the focusing position of the focusing lens.

With the image pickup apparatus according to the present invention, the controller detects the focusing position of the focusing lens, by illuminating the light by the supplementary light illuminating unit on the object, causes the focusing lens to be moved to the focusing position, and detects the information on the focusing position of the focusing lens as light is not illuminated by the supplementary light illuminating unit on the object. The controller corrects the movement position of the focusing lens based on the detected information. With the present image pickup apparatus, the focusing position of the focusing lens is controlled based on the information pertinent to the focusing position of the focusing lens as detected when the supplementary light is illuminated and the information pertinent to the focusing position of the focusing lens as detected when no supplementary light is illuminated.

Other objects, features and advantages of the present invention will become more apparent from reading the embodiments of the present invention as shown in the drawings.

BEST MODE FOR CARRYING OUT THE INVENTION

An image pickup apparatus for electronically photographing a still image, in accordance with the present invention, is hereinafter explained. In the embodiment, now explained, the present invention is applied to a digital still camera. The digital still camera, to which the present invention is applied, has a configuration shown in FIG. 1.

Figure 1:
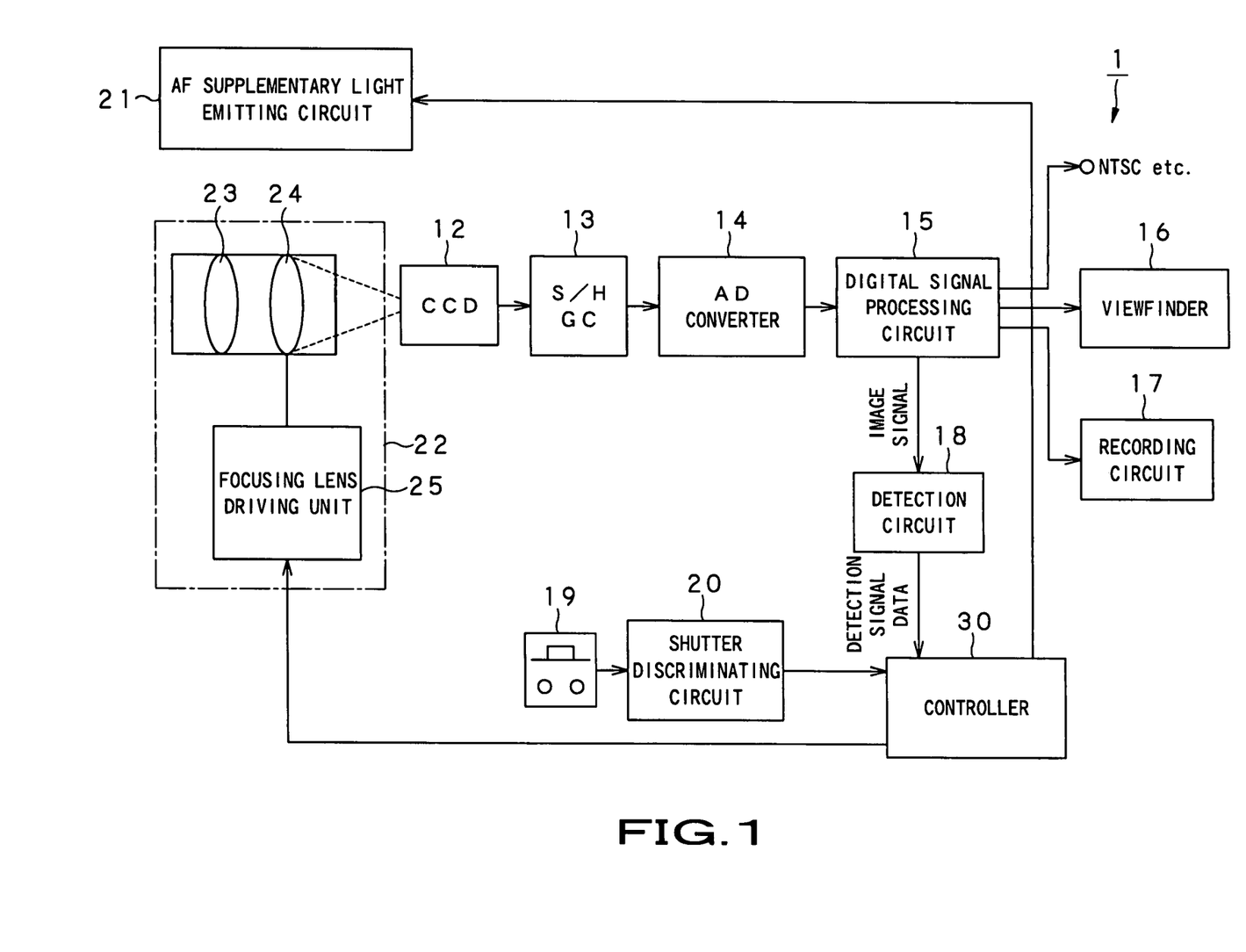
FIG. 1 is a block diagram showing a digital still camera in accordance with the present invention.

The digital still camera 1, embodying the present invention; includes a CCD 12, a S/H·GC (Sampling Hold Gain Control) circuit 13, an AD converter 14, a digital signal processing circuit 15, a viewfinder 16, a recording circuit 17, a detection circuit 18, a shutter release button 19, a shutter discriminating circuit 20, an AF supplementary light emitting circuit 21, a lens unit 22 and a controller 30, as shown in FIG. 1.

The CCD 12 transduces the imaging light of an object, formed on a light receiving surface, through the lens unit 22, into electrical signals, from one pixel to another, to output the resulting pixel signals. The pixel signals, stored in the CCD 12, are sent at a preset timing (image updating period) to the S/H·GC circuit 13.

The S/H·GC circuit 13 performs analog processing, such as sampling or amplification, on the pixel signals supplied from the CCD 12. The analog image signals, output from the S/H·GC circuit 13, are supplied to the AD converter 14.

The AD converter 14 samples the analog image signals, supplied from the S/H·GC circuit 13, at a preset sampling rate, to convert the signals into digital image signals. The digital image signals, output from the AD converter 14, are supplied to the digital signal processing circuit 15.

From the digital image signals, supplied from the AD converter 14, the digital signal processing circuit 15 generates digital image signals of, for example, NTSC or the format required for a recording medium, to output the resulting signals to outside. During framing, the digital signal processing circuit 15 generates display image signals from the digital image signals, to supply the so generated display image signals to the viewfinder 16. During photographing a still image, the digital signal processing circuit 15 generates one-shot of still image signals from the digital image signals and compresses the resulting signals to supply the compressed signals to the recording circuit 17.

The viewfinder 16 is an electronic display device formed by, for example, a liquid crystal panel. During the framing, display image signals are input to the viewfinder 16 from the digital signal processing circuit 15 and displayed thereon.

The recording circuit 17, at the time of photographing a still image, records the still image signals output from the digital signal processing circuit 15 on, for example, a recording medium, such as a memory card.

The detection circuit 18 generates, from the image signals supplied from the digital signal processing circuit 15, a variety of detection signals required for automatic focusing (AF), automatic exposure (AE) or automatic white balance adjustment. These detection signals are read out by the controller 30 at a preset time interval. The controller 30 controls e.g., the lens unit 22, based on the various read-out detection signals, for forming an appropriate photographed image. Specifically, the detection signals detected by the detection circuit 18 may be exemplified by detection signals pertinent to automatic focusing or those pertinent to automatic exposure control. The detection circuit 18 detects, as detection signals pertinent to automatic focusing, edge components of luminosity in an AF detection area as set at a predetermined position on the photographed image and integrates the edge components to output the resulting contrast value. The detection circuit 18 also detects, as detection signals pertinent to the automatic exposure control, the luminosity of the luminosity detection area set in a preset position on the photographed image, and outputs the luminosity level.

The shutter release button 19 is a momentary type pressing switch actuated by a user. This shutter release button 19 is provided with a function of distinguishing a state in which the switch is not pressed (off), a state in which the switch has been fully pressed (full thrusting) and a state in which the switch is pressed only partway (partial thrusting) to effect the switching correspondingly. These three thrust states of the shutter release button 19 (off, partial thrusting and full thrusting) are discriminated by the shutter discriminating circuit 20 and the resulting discrimination information is sent to the controller 30.

The AF supplementary light emitting circuit 21 is a light emitting circuit for emitting the visible light (AF supplementary light) to an object at the time of automatic focusing. The AF supplementary light emitting circuit 21 is provided with laser light emitting means, such as a light emitting diode or a laser diode, or a lamp, as light emitting devices. The light emitting device of this AF supplementary light emitting circuit 21 is mounted on the front surface or on the top of a casing for radiating light to the object as an object of photographing. This AF supplementary light emitting circuit 21 is controlled as to driving or light radiating timing by the controller 30.

The lens unit 22 includes a zoom lens 23, a focusing lens 24 and a focusing lens driving unit 25 for driving the focusing lens 24. The lens unit 22 also includes optical components, such as an infrared light cut-off filter for cutting off the infrared light of the incident light, iris stop sectors for limiting the incident light volume, or shutter sectors for interrupting the incident light, a zoom lens driving unit for driving the zoom lens 23, an iris stop driving unit for driving the iris stop sectors and a shutter driving unit for driving the shutter sectors.

The zoom lens 23 within the lens unit 22 is mounted so that its optical axis is coincident with a plumb line drawn from approximately the center of the light receiving surface of the CCD 12. The zoom lens 23 is provided for linear movement in the fore-and-aft direction on the optical axis. The imaging scale factor of the image formed on the light receiving surface of the CCD 12 is changed depending on the position to which the zoom lens has been moved. The zoom lens 23 has its position of movement controlled by the controller 30 via zoom lens driving unit.

A focusing lens 24 in the lens unit 22 is mounted so that its optical axis is coincident with a plumb line drawn from approximately the center of the light receiving surface of the CCD 12. The focusing lens 24 is mounted for performing linear movement in the fore-and-aft direction on the optical axis such that the focusing position of the image formed on the light receiving surface of the CCD 12 is changed depending on the position to which the focusing lens has been moved. The focusing lens 24 has its position of movement controlled by the controller 30 via a focusing lens driving unit 25.

The controller 30 controls respective components of the digital still camera 1. As an example, the controller 30 performs framing processing control (off), automatic focusing processing control (partial thrust) or still image recording control (full thrust), based on the thrust state of the shutter release button 19.

Meanwhile, the framing processing is such a processing of displaying an image being photographed by the CCD 12 on the viewfinder 16 so as to permit the user to confirm the object position in the picture or the picture composition prior, to photographing. During this framing, the CCD 12 photographs one image at each preset image updating period, for example, one-thirtieth of a second, to output image signals obtained on photographing. Thus, the image displayed on the viewfinder 16 is updated every preset time period, such as every one-thirtieth of a second, so that the user is able to confirm the image displayed on the viewfinder 16 as a moving image. This framing processing is carried out when the digital still camera 1 itself is in a state capable of photographing and the shutter release button 19 is off, that is when the user is not pressing the shutter release button 19.

The automatic focusing processing is a processing for automatically setting the focusing of an object image that is a subject-matter of photographing of a still image. That is, the automatic focusing processing is the processing of automatically adjusting the position of movement of the focusing lens 24 to effect focusing adjustment of the image for photographing. If, in the course of framing processing, the shutter release button 19 is pressed partway, the automatic focusing processing of detecting the focusing position based on the photographed image is initiated. Specifically, during the automatic focusing processing, the controller 30 causes the focusing lens 24 to be moved to acquire contrast values at the respective positions of the focusing lens from the detection circuit 18 to verify the increase or decrease of the contrast values for the respective movement positions of the focusing lens 24. Based on this increase/decrease of the contrast values, the controller 30 then determines the degree of focusing of the image relative to the positions of movement of the focusing lens 24 to shift the focusing lens 24 to a position of the highest degree of focusing. The control sequence of the processing for automatic focusing will be explained in detail subsequently.

In the digital still camera 1, the opening degree of the iris stop sectors and the speed of an electronic shutter, that is the F-number and the shutter speed, as required in effecting the automatic focusing, are also set during this automatic focusing processing. The white balance setting, as required in effecting the automatic focusing, is also set.

The still image photographing processing is the processing of photographing one shot of the object image and recording the one-shot object image on a recording medium. With the digital still camera 1, if the shutter release button 19 is fully thrust after completion of the automatic focusing processing, the position of movement of the focusing lens 24, the degree of opening of the iris stop sectors and the electronic shuttering time, for example, are set to the values as detected by the automatic focusing processing, to capture a one-shot still image by the CCD 12. The still image, thus captured, is processed by, for example, the digital signal processing circuit 15, with e.g., compression, so as to be stored on the recording medium.

An illustrative structure of the AF supplementary light emitting circuit 21 is explained hereinafter.

Figure 2:
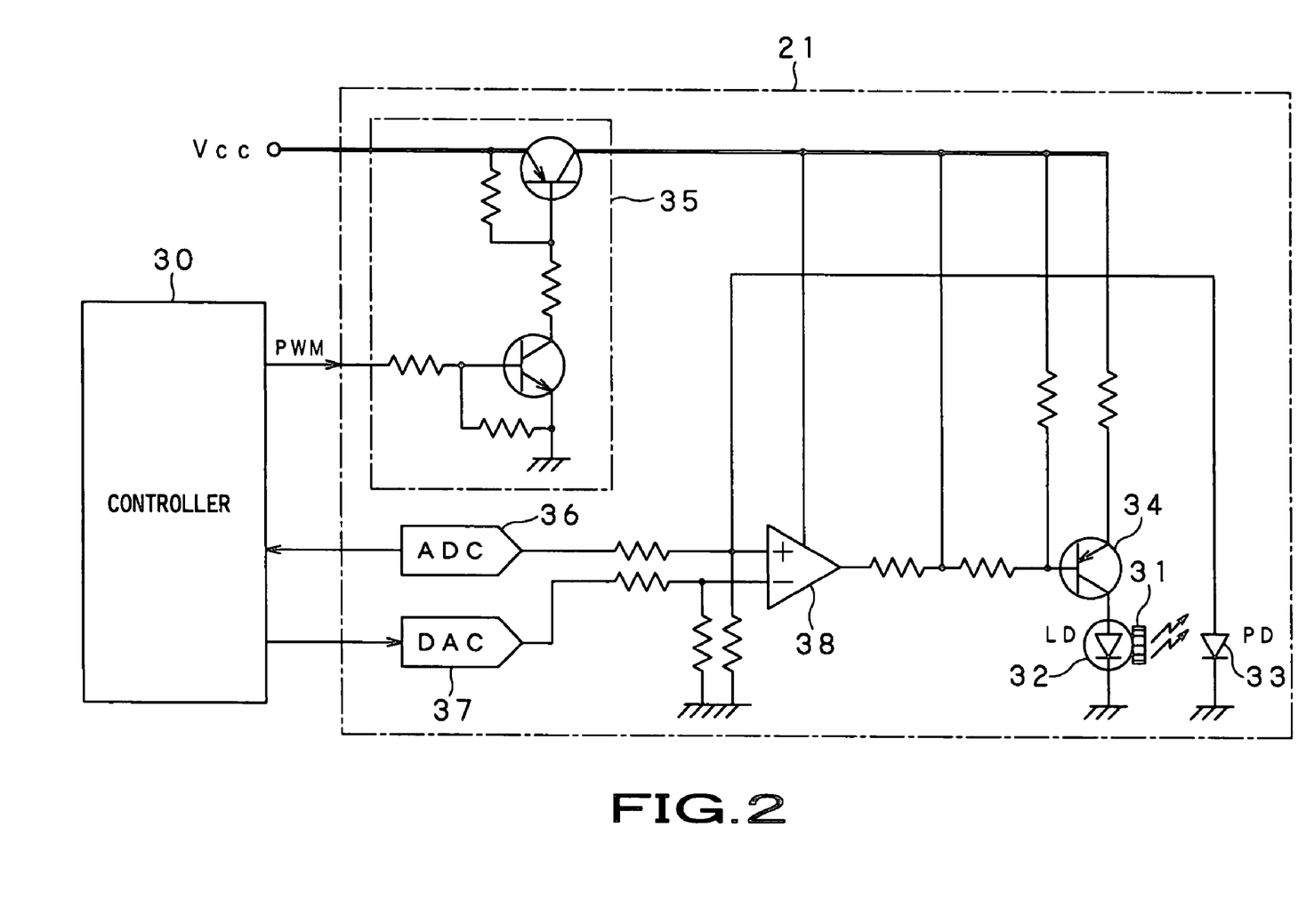
FIG. 2 is a circuit diagram of a circuit for generating supplementary light for AF of the digital still camera.

FIG. 2 shows a light emitting circuit for radiating the laser light, transmitted through a diffraction grating, as the AF supplementary light.

Referring to FIG. 2, the AF supplementary light emitting circuit 21 includes a laser diode 32 for radiating the laser light through a diffraction grating 31, a photodetector 33 for detecting the volume of the outgoing light from the laser diode 32, a transistor 34 for controlling the current flowing through the laser diode 32, a switching circuit 35 for switching the power (Vcc) supplied to the laser diode 32, and an AD converter 36 for digitizing the feedback voltage from the photodetector 34 to supply the resulting voltage to the controller 30. The AF supplementary light emitting circuit 21 also includes a DA converter 37 for analogizing the radiated light volume control signal supplied from the controller 30 to the laser diode 32 and an operational amplifier 38 for differentially calculating the feedback voltage from the photodetector 34 and the supply current control signal from the controller 30 to supply the resulting signal to the base terminal of the transistor 34 to stabilize the current passed through the laser diode 32.

The laser light, radiated by the laser diode 32 to outside via the diffraction grating 31, becomes the light of a fixed pattern conforming to a pattern of concavity and convexity formed in the diffraction grating 31. The technique of radiating this laser light is used in for example a laser pointer. In the present digital still camera 1, the reflected light of this light of the fixed pattern is used to effect the automatic focusing.

In general, the laser diode is used in a unit component combined with a photodiode, because the light volume of the laser diode is changed delicately by changes in temperature such that the output light volume cannot be controlled to be constant with constant current driving. For controlling the outgoing light volume of the laser diode to a constant value with the use of the photodiode, it is sufficient to arrange the photodiode in proximity to the light radiating source of the laser diode and to feed back the laser driving current with the aid of the detected voltage of the photo diode to provide for a constant laser output. In this case, the laser output can be managed to a approximately constant value because the temperature changes of the photodiode sensitivity are extremely small. In the circuit of FIG. 2, the volume of light radiated from the laser diode 32 can be controlled to a constant value, because the voltage fed back from the photodetector 33 and the reference voltage from the DA converter 37 are differentially processed to control the supply current to the laser diode 32.

In the AF supplementary light emitting circuit 21 shown in FIG. 2, the light volume of the light radiated by the laser diode 32 is controlled by supplying the reference voltage (analog reference voltage through the DA converter 37) by switching from the controller 30 to the operational amplifier 38, and the power supplied by the switching circuit 35 to the laser diode 32, in accordance with the PWM system.

The switching circuit 35 also serves as a controlling circuit for controlling the radiation or non-radiation of light of the AF supplementary light. The PWM switching is controlled by an ON/OFF signal (port output) from the controller 30. The controller 30 controls the PWM period in synchronism with the update period of the photographed image, for example, one-thirtieth of a second. Meanwhile, the conduction or non-conduction of the current through the laser diode 32 is by switching the power supply (Vcc) of the driving circuit of the laser diode 32.

It should be noted that the reference voltage supplied to the operational amplifier 38 is adjusted to provide for a light radiation output which will give a light volume enabling automatic focusing under desired distance, angle of view and object conditions when the AF supplementary light is turned on with the desired PWM duty ratio (DC light emission is also possible). This adjustment absorbs device-specific sensitivity variations that may occur from one digital still camera 1 to another. Once this adjustment has been made, the light volume can be adjusted according to the object conditions, by varying the PWM pulse duty. Meanwhile, the reference voltage itself may be varied, instead of performing the pulse duty control, for achieving equivalent output control.

Figure 3:
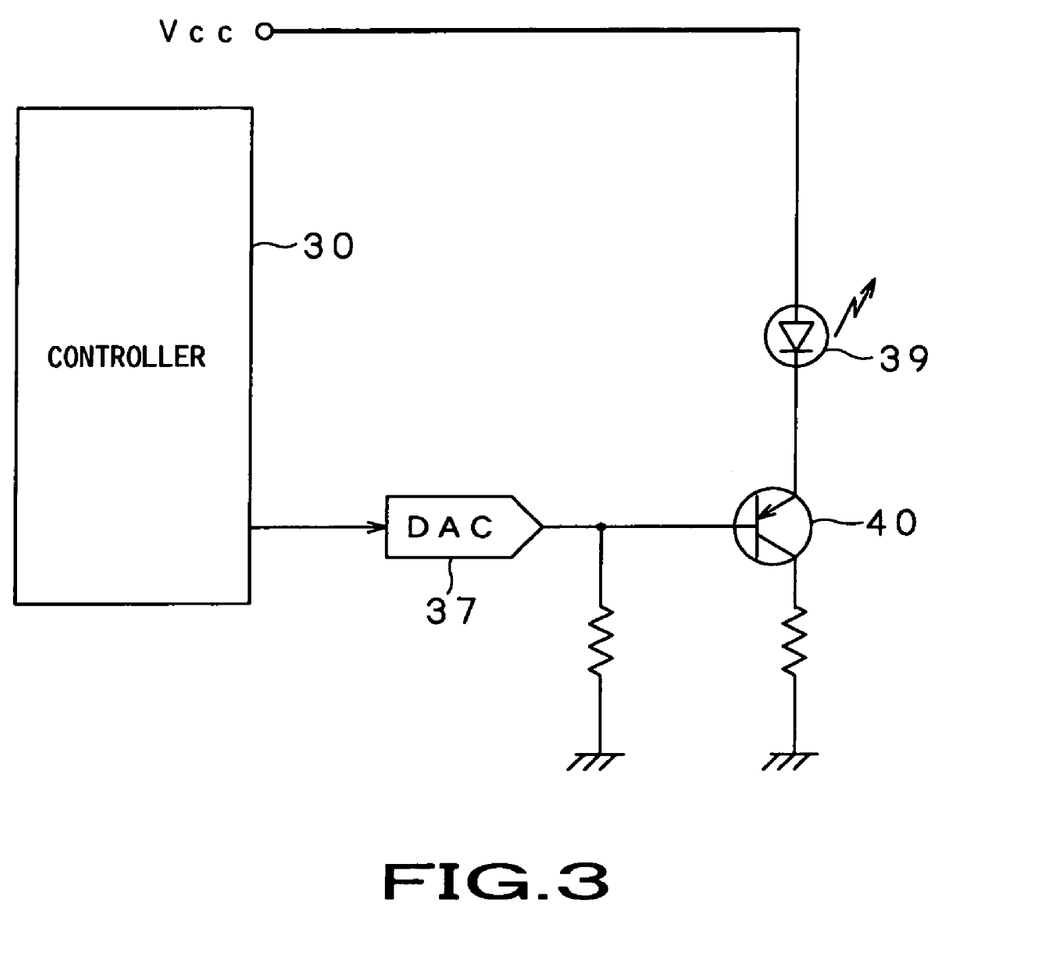
FIG. 3 is a circuit diagram showing a modification of the circuit for generating supplementary light for AF.

In the above-described circuit configuration of the AF supplementary light emitting circuit 21, the laser diode, radiating the laser light which has passed through the diffraction grating, is used as light emitting means. The AF supplementary light, radiated from other light sources, such as LEDs, may also be used instead of light radiated from the laser diode. For example, if the LED is used as the light emitting means, the circuit configuration is as shown in FIG. 3 in which the LED 39 is driven by a transistor 40.

The decision of light emission by the AF supplementary light is now explained.

The AF supplementary light is not generated at all times when performing the automatic focusing processing, but is generated when sufficient luminosity is not achieved with measly extraneous light, as, for example, under low luminosity environment, so that accurate automatic focusing cannot be achieved. Before the shutter release button 19 is pressed partway and the automatic focusing is commenced, the controller 30 proceeds to decide on whether or not light radiation of the AF supplementary light is to be effected. Additionally, this decision information is presented to the user by way of a premonition on e.g., the viewfinder 16.

The controller 30 performs automatic exposure control (AE), in addition to the automatic focusing, as described above. During framing, the controller 30 performs automatic exposure control at all times, and always controls the gain, electronic shuttering or the iris stop so as to give an optimum exposure setting. This automatic exposure control is performed based on the luminosity level (brightness information) detected from within the photographed image. The controller 30 calculates the luminosity information, indicating the brightness of the object, from one photographed image to another. This brightness information becomes large or small if the object is light or dark, respectively. Based on the luminosity information currently obtained, the controller 30 verifies, from one photographed image to another, whether or not the brightness is such as to allow for automatic focusing, and presents the corresponding information to the user.

On the other hand, when the controller 30 has determined that, if the shutter release button 19 is pressed partway such that the AF start command is issued, the current brightness is not such as to permit automatic focusing, the controller 30 decides on radiation of the AF supplementary light (it being noted that the supplementary light is not radiated at this time point). Moreover, the controller 30 determines the upper limit of the shutter speed of the electronic shutter to give a brightness sufficient to permit AF on emission of the AF supplementary light, and sets predetermined values of the gain and the F-number to proceed to exposure control again.

The shutter speed is set to a time duration which is longer than the maximum value of the PWM duty at the time of laser light emission control of the AF supplementary light, and to the time duration which is shorter than the minimum light exposure period for the image when photographing a one-shot image (image read-out period from the CCD). Assuming that the minimum image update period is one-thirtieth of a second, and that the PWM duty of the laser is on the condition of one-sixtieth of a second "ON" and one-sixtieth of a second "OFF", the upper limit of the shutter is set to one-thirtieth of a second. By this setting, the fastest automatic focusing processing time may be achieved as the emitted AF supplementary light is received in its entirety. Meanwhile, if the image readout period from the CCD is shorter, a shutter speed smaller than one-thirtieth of a second may be selected. If, with a view to expanding the reachable distance of the AF supplementary light, the light emission is to be longer than the minimum image update period, the light exposure time may be longer than the minimum image update period.

Figure 4:
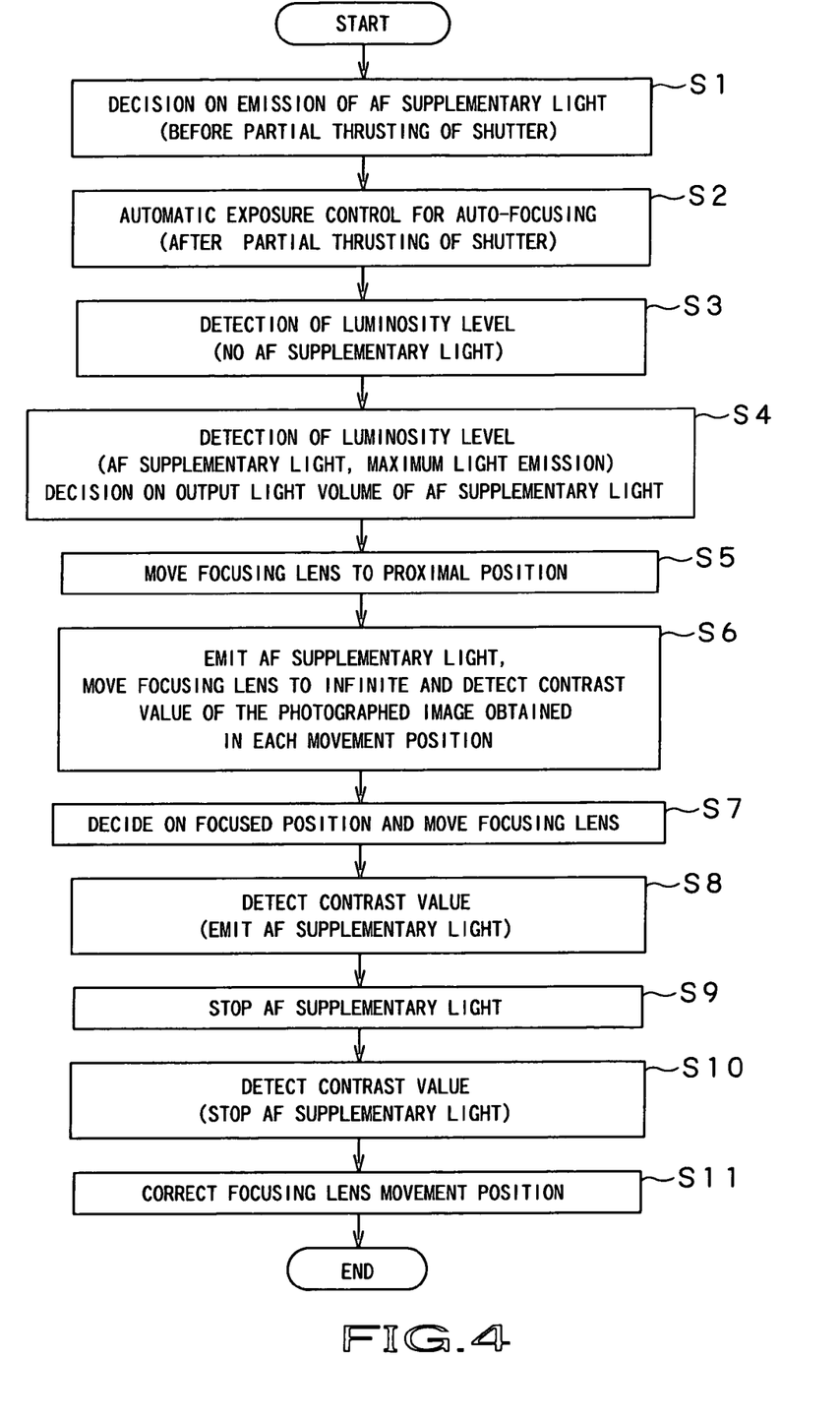
FIG. 4 is a flowchart for auto-focusing processing at the time of emitting the supplementary light for AF.
Figure 5:
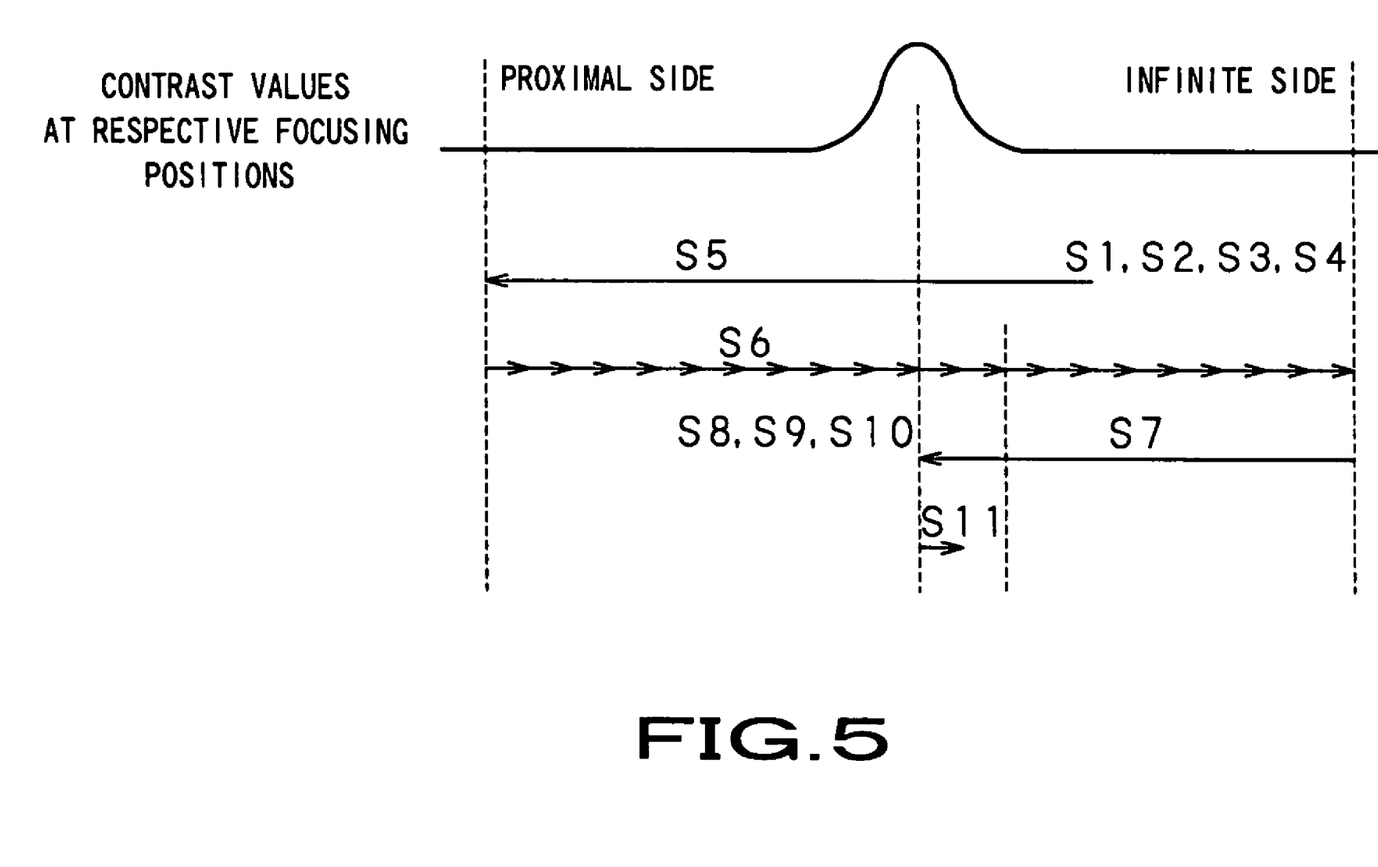
FIG. 5 shows the movement position of the focusing lens and the level of the contrast value at the time of processing for automatic focusing.

The control flow of the automatic focusing processing at the time of emission of the AF supplementary light is hereinafter explained. FIG. 4 shows a processing flowchart by the controller 30 at the time of the automatic focusing, while FIG. 5 shows the positions of movement of the focusing lens 24 at the respective steps during automatic focusing and contrast values of the photographed image as detected for the respective positions of the focusing lens 24.

Before the shutter release button 19 is pressed partway, that is, in the framing status with the shutter release button 19 off, the controller 30 detects the brightness of the object, based on the luminosity level of the photographed image as detected through the CCD 12, to verify whether or not the emission of the AF supplementary light is necessary (step S1). In the present embodiment, it is checked whether the AF supplementary light is on or off before the shutter release button 19 is pressed partway, which is in order to apprize the user of the premonition of the emission of the AF supplementary light before the user presses the shutter release button 19 partway. If it is unnecessary to apprize the user of the premonition of the emission of the AF supplementary light, the emission or non-emission of light may be determined from the results of correction of the automatic exposure control directly after pressing the shutter release button partway in the next step S2.

If it is determined that emission of the AF supplementary light is necessary, and the shutter release button 19 is pressed partway, the controller 30 performs automatic exposure control to establish a light exposure state suitable for automatic focusing (step S2). That is, exposure control is made so that the state of light exposure of the AF detection area, in which the contrast for effecting the automatic focusing is to be detected, is such a state that is able to detect the contrast. Consequently, the luminosity level of the AF detection area or its vicinity is detected to perform light exposure control. In the present embodiment, there are occasions where the exposure in the image information from the CCD 12 prior to partial thrusting of the shutter release button 19 is intentionally changed by the user to fit into his or her liking or where the AF detection area is dark in terms of the balance with the overall brightness. Thus, automatic exposure control for automatic focusing as from the time of partial thrusting of the shutter release button 19 is carried out so that at least the automatic focusing is possible within the AF detection area of the photographed image.

The controller 30 then acquires the luminosity level of the AF detection area or its vicinity, at the exposure controlled in the step S2, without emitting the AF supplementary light (step S3).

The controller 30 then outputs the duty corresponding to the upper limit of the PWM output of the AF supplementary light emitting circuit 21 to effect the maximum light emission of the AF supplementary light emitting circuit 21 to acquire the luminosity level of the AF detection area or its vicinity (step S4). The controller 30 then evaluates the difference between the luminosity level in the non-emitting state as detected in the step S3 and the luminosity level at the maximum light emitting state and, based on the so detected difference, decides on the output light volume of the AF supplementary light which is necessary and minimum for automatic focusing processing. Meanwhile, the focusing lens 24 is not moved because the luminosity level in the state emitting the AF supplementary light is to be compared here to the luminosity level in the state not emitting the AF supplementary light.

The controller 30 causes the focusing lens 24 to be moved to the most proximal point in the range of movement (step S5).

After the focusing lens 24 has been moved to the most proximal point, the controller 30 causes the focusing lens 24 to be moved in a step S6 in a direction towards the infinite end, as the AF supplementary light is emitted at an output light volume as set in the step S4. At this time, the history of the contrast values of the respective photographed images obtained during movement, and the history of the information on the focusing positions associated with the so obtained contrast values, are stored.

When the focusing lens has reached the infinite end, the controller 30 evaluates the contrast values collected during the lens movement, and decides on the movement position, evaluated to be the most probable focusing position, as being the first focused position (step S7). For example, the movement position which gives the peak of the contrast value is determined to be the focusing position. The controller 30 causes the focusing lens 24 to be moved to the movement position determined to be the focusing position.

When the focusing lens has been moved to the focusing position, the controller 30 acquires the contrast value of the photographed image at this focused position, as the AF supplementary light continues to be emitted (step S8). Meanwhile, the contrast value here may be extracted from the history acquired in the step S6.

The controller 30 then halts the emission of the AF supplementary light (step S9).

The controller 30 then acquires the contrast value of the photographed image, at this focusing position, as the AF supplementary light is not emitted (step S10).

The controller 30 then evaluates, based on both the contrast value in the state the AF supplementary light is emitted and the contrast value in the state the AF supplementary light is not emitted, the amount of correction of the focusing position of the focusing lens 24, and causes the focusing lens 24 to be moved an amount corresponding to the amount of the correction thus found. The position thus corrected is now the focusing position (step S11).

The present digital still camera 1 performs the automatic focusing processing, at the time of the emission of the AF supplementary light, as described above.

The setting of the volume of the AF supplementary light in the step S3 and that in the step S4 are now explained in more detail.

In the steps S3 and S4, the luminosity level in the AF detection area on the photographed image or the luminosity level in its vicinity is detected. In this step S3, the luminosity level is acquired as the light exposure is controlled automatically in the step S2. The value obtained in this step S3 is to be the luminosity level in the light-off-state (ILUMI_OFF). In the step S4, the maximum light is additionally emitted from the AF supplementary light emitting circuit 21, in the exposure-controlled state in the step S2, and the luminosity level of the AF detection area or that in its vicinity at this time is acquired. The luminosity acquired at this step S4 is to be the luminosity level in the light-on-state (ILUMI_ON).

It should be noted that the luminosity level as detected at the steps S3 and S4 is obtained by integrating the luminosity in the AF detection area of the photographed image or the luminosity in its vicinity and integrating the resulting integrated value for one or more images. In the present embodiment, the luminosity value obtained from a one-shot photographed image is used.

As for the range of detection of the luminosity level, if the angle of illumination of the AF supplementary light is N°, the angle of view of the photographed image is M° and the optical axis offset of the AF supplementary light is 0° and negligible, an area of N° about the center of the angle of view as a reference is set as the area for acquisition of the luminosity level. By this setting, the luminosity level in the light-off-state (ILUMI_OFF) can be contrasted to the luminosity level in the light-on-state (ILUMI_ON), without referring to the luminosity level of the area not illuminated by the AF supplementary light, even in cases wherein a variable zoom lens is used.

The luminosity level as detected may be normalized as the luminosity level per unit area based on the superficial measure of the luminosity detection area. The reason for this is that, if, in finding the integrated value of the luminosity level, the area not illuminated with the AF supplementary light is detected, the detected luminosity level is relatively increased or decreased even though the volume of the illuminated light is the same.

In the step S4, the luminosity level ratio (ILUMI_RATIO) is calculated from the luminosity level in the light-off-state (ILUMI_OFF) and the luminosity level in the light-on-state (ILUMI_ON) in accordance with the following (1) to (4):

(1) In case the luminosity level in the light-on-state (ILUMI_ON)>noise level (NOISE_LEVEL)

$$ILUMI\_ON\_RIV = ILUMI\_ON - NOISE\_LEVEL$$

(2) In case the luminosity level in the light-on-state (ILUMI_ON)≦noise level (NOISE_LEVEL)

$$ILUMI\_ON\_RIV = 0$$

(3) In case the ILUMI_ON_REV>luminosity level in the light-off-state (ILUMI_OFF)

$$ILUMI\_RATIO = \{(ILUMI\_ON - ILUMI\_OFF) * 100\} / ILUMI\_ON$$

(4) In case the ILUMI_ON_REV≦luminosity level in the light-off-state (ILUMI_OFF)

$$ILUMI\_RATIO = 0.$$

Although simply the ratio between the luminosity level in the light-on-state and the luminosity level in the light-off-state may be evaluated, the luminosity level becomes smaller and the luminosity level ratio (ILUMI_RATIO) becomes unstable if the object is on an extremely distant position or if the object is of low reflectance. Thus, if the luminosity level in the light-on-state (ILUMI_ON) is of a small value and is determined to be noisy, the luminosity level ratio (ILUMI_RATIO) is uniformly set to 0. By so doing, light and stable AF supplementary light illumination can be achieved even in cases wherein the automatic focusing is to be achieved for an extremely distant object or an object with only low reflectance.

The light emission volume of the AF supplementary light (ILUMI_LEVEL) as required in automatic focusing is determined on the basis of the calculated luminosity level ratio (ILUMI_RATIO). The light emission volume of the AF supplementary light (ILUMI_LEVEL) in response to the luminosity level ratio (ILUMI_RATIO) is evaluated, for example, by comparison to stepped threshold values (th1, th2, th3, th4, th5: th1>th2>th3>th4>th5), as follows:

ILUMI_LEVEL=6 th1≦ILUMI_RATIO
ILUMI_LEVEL=5 th2≦ILUMI_RATIO<th1
ILUMI_LEVEL=4 th3≦ILUMI_RATIO<th2
ILUMI_LEVEL=3 th4≦ILUMI_RATIO<th3
ILUMI_LEVEL=2 th5≦ILUMI_RATIO<th4
ILUMI_LEVEL=1 ILUMI_RATIO<th5.

It is noted that the AF supplementary light emission becomes maximum for ILUMI_LEVEL=1, with the volume of the emitted light decreasing as the value of the ILUMI_LEVEL increases.

If the "luminosity level in the light-off-state (ILUMI_OFF)≧sufficient luminosity level not in need of supplementary light", the light emission volume of the AF supplementary light is set to the minimum light emission volume (here, ILUMI_LEVEL=6), irrespective of the aforementioned calculation of the light emission volume.

The above-described processing is for a state in which the imaging environment is so dark that the user is unable to estimate the brightness such that it is determined to be necessary to use the AF supplementary light but in which the emission of the AF supplementary light is unnecessary in case the automatic exposure control of step S2 is carried out. That is, in the case of the present digital still camera 1, premonition is given to the user as to whether or not emission of the supplementary light is to be made prior to pressing the shutter release button 19 partway. In the case that this premonition is made, the AF supplementary light is emitted, as a result of exposure control of step S2, even if the light emission of the AF supplementary light is unnecessary. In such case, it is of high probability that the difference between the luminosity level of the AF detection area in case the AF supplementary light is emitted and the luminosity level of the AF detection area in case the AF supplementary light is not emitted is null such that the above-described calculation technique results in ILUMI_RATIO=0. In such case it is likely that full light illumination occurs despite the fact that the brightness is not in need of the AF supplementary light. The present processing is performed to prevent full light emission on such occasions.

If this light emission volume (ILUMI_LEVEL) is calculated, the duty (DUTY) of PWM switching the power driving the light emission means is set, based on the volume of light emission, as follows:

DUTY=MAX_DUTY/*ILUMI*_LEVEL where the MAX_DUTY is the maximum duty of the PWM output (the duty which emits light of the maximum light volume).

With the present digital still camera 1, in which the volume of the emission of the AF supplementary light is controlled as described above, the supplementary light can be illuminated with a volume of light emission optimum for automatic focusing. For example, for an object with low reflectance or an extremely remote object, a sufficient quantity of light may be emitted, whereas, for an object with high reflectance or an extremely near object, only a necessary quantity of light may be emitted, thus minimizing the AF time and thereby saving in power. In addition, the AF supplementary light can be sent to a remote place.

Although the volume of light emission (ILUMI_LEVEL) is calculated in the above-described embodiment using stepped threshold values from the luminosity level ratio (ILUMI_RATIO), this is merely illustrative such that the volume of light emission (ILUMI_LEVEL) may be calculated from a curved or rectilinear approximation indicating the correlation between the volume of the emitted light of the AF supplementary light and the luminosity level ratio, or the volume of the emitted light (ILUMI_LEVEL) may be set in detail from a more elaborate table. Although the volume of the emitted light is changed by the PWM duty for switching, the power of the AF supplementary light, this again is merely illustrative because the volume of the emitted light may be changed by controlling the voltage of the light emitting means or by controlling the current.

The processing for controlling the focusing position of the focusing lens at steps S8 to S11 is now explained in detail.

In the steps S8 and S10, the contrast value of the AF detection area provided in the photographed image is detected as the degree of focusing of the photographed image. This contrast value is obtained e.g., on integrating image edge components in the AF detection area. The degree of focusing of the photographed image is determined based on the magnitude of the contrast value. The contrast value at the time of emission of the AF supplementary light, detected in the step S8, serves as a contrast value in the light-on-state (CONT_ON), while the contrast value at the time of non-emission of the AF supplementary light, detected in the step S10, serves as a contrast value in the light-off-state (CONT_OFF). If, in the imaging environment in which there is no light except the AF supplementary light, the AF supplementary light is in the non-emission state, the object becomes extremely dark such that edge components cannot be detected from the photographed image and hence the contrast information cannot be produced. However, in the imaging environment in which the AF supplementary light is mixed with extraneous light, the object has certain luminosity by such extraneous light, so that the edge components are detectable.

In a step S11, the contrast value in the light-on-state of the AF supplementary light (CONT_ON) is compared to the contrast value in the light-off-state of the AF supplementary light (CONT_OFF) to estimate the degree of mixing of the extraneous light in the AF supplementary light to calculate the amount of correction β of the movement position of the focusing lens 24.

The method of calculating the amount of correction β is now explained.

First, an amount of correction α for the effect of the AF supplementary light by itself corresponds to the offset caused by chromatic aberration attributable to wavelength characteristics of the AF supplementary light. Thus, the amount of correction α is a value uniquely determined with respect to the focusing position as detected on emitting the AF supplementary light.

On the other hand, an amount of influence (I) of the extraneous light to the AF supplementary light may be calculated from the ratio of the contrast value in the light-on-state of the AF supplementary light (CONT_ON) to the contrast value in the light-off-state of the AF supplementary light (CONT_OFF) as follows:

amount of influence (*I*)=(*CONT*_ON)/(*CONT*_OFF).

The amount of correction β for the focusing lens 24 in case the extraneous light is added to the AF supplementary light may be calculated from the amount of correction α and the amount of influence (I) as follows:

If the amount of influence (I)>threshold value th11 the amount of correction β is large (α100%);

if the threshold value th11≧amount of influence (I)>threshold value th12 the amount of correction β is medium (50% of α); and if the threshold value th12≧amount of influence (I) the amount of correction β is null (0% of α).

In the step S11, the movement position of the focusing lens 24 is moved by an amount equal to the amount of correction β thus estimated. This completes the automatic focusing operation.

With the present digital still camera 1, in which the focusing position of the focusing lens 24 is controlled as described above, the focusing position can be controlled correctly even if the frequency response of the AF supplementary light is on the low wavelength side of the visible light range or if the digital still camera 1 is placed in an environment where there is the extraneous light other than the AF supplementary light.

In the above-described embodiment, the amount of correction β for the case in which there is the effect of the extraneous light is calculated using stepped threshold values. This is, however, merely illustrative, such that amount of correction β may be calculated using a curved or linear approximation representing the correlation between the effect of the influence (I) and the amount of the correction β or using a more elaborate table.

INDUSTRIAL APPLICABILITY

With the image pickup apparatus according to the present invention, described above; the focusing position of the focusing lens is controlled on the basis of both the information pertinent to the focusing position of the focusing lens as detected in the state of illuminating the supplementary light and the information: pertinent to the focusing position of the focusing lens as detected in the state of not illuminating the supplementary light, so that the focusing position can be correctly detected even if the frequency response of the supplementary light is on, for example, the low frequency side of the visible light or if the digital still camera is in an environment where there is a light source for extraneous light in addition to the supplementary light.

The invention claimed is:

1. An image pickup apparatus, comprising:
a camera pickup unit for receiving imaging light from an object;
means for generating an image of said object;
a focusing lens provided within said camera pickup unit;
a supplementary light illuminating unit for illuminating supplementary light on said object; and
a controller for controlling said camera pickup unit, said focusing lens, and said supplementary light illuminating unit,
wherein said controller controls a position of the focusing lens as a function of a luminosity level ratio between luminosity level when the supplementary light illuminating unit is on, and the luminosity level when the supplementary light illuminating unit is off,
wherein if the object is disposed at a location that exceeds a predetermined distance or if the object is of a reflectance below a predetermined threshold, the luminosity level ratio is set to zero.

2. The image pickup apparatus according to claim 1, wherein said controller turns the supplementary light illuminating unit on and determines a luminosity level of said object in a light-on-state,
wherein said controller turns the supplementary light illuminating unit off and determines a luminosity level of said object in a light-off-state, and
wherein said controller controls the position of the focusing lens as a function of the luminosity level ratio between the luminosity level in the light-on-state, and the luminosity level in the light-off-state.

3. The image pickup apparatus according to claim 2, wherein if the luminosity level in the light-on-state is small and noisy, the luminosity level ratio is set to zero.

4. The image pickup apparatus according to claim 1, wherein said controller detects the position of said focusing lens when light is illuminated on said object by said supplementary light illuminating unit,
wherein said controller controls the movement of the focusing lens to a focusing position,
wherein the controller detects the focusing position of said focusing lens when light is not illuminated on said object by said supplementary light illuminating unit, and wherein said controller corrects the movement of said focusing lens based on the detected position.

5. The image pickup apparatus according to claim 1, wherein said controller controls the position of the focusing lens based on the image taken by said camera pickup unit.

6. The image pickup apparatus according to claim 1, wherein said controller controls the position of the focusing lens based on the contrast of the image taken by said camera pickup unit.

7. The image pickup apparatus according to claim 1, wherein said controller controls volume of emission of the supplementary light based on luminosity of the image taken by said camera pickup unit.

8. The image pickup apparatus according to claim 1, wherein said supplementary light illuminating unit comprises a light emitting diode (LED) for emitting light.

9. The image pickup apparatus according to claim 1, wherein said supplementary light illuminating unit comprises an electrical bulb for emitting light.

10. The image pickup apparatus according to claim 1, wherein said supplementary light illuminating unit comprises a laser light emitter for emitting laser light.

11. The image pickup apparatus according to claim 1, wherein said supplementary light illuminating unit comprises a laser light emitter for emitting laser light to said object via a diffraction grating.

12. An image pickup apparatus, comprising:
imaging means for imaging an object by transducing imaged light into electrical signals to generate an image of said object;
focusing means for focusing said imaging light;
illuminating means for illuminating supplementary light on said object; and
control means for controlling said imaging means, said focusing means, and said illuminating means,
wherein said controller controls a position of the focusing means as a function of a luminosity level ratio between luminosity level when the illuminating means is on, and the luminosity level when the illuminating means is off,
wherein if the object is disposed at a location that exceeds a predetermined distance or if the object is of a reflectance below a predetermined threshold, the luminosity level ratio is set to zero.

13. The image pickup apparatus according to claim 12, wherein said control means turns the illuminating means on and determines a luminosity level of said object in a light-on-state,
wherein said control means turns the illuminating means off and determines a luminosity level of said object in a light-off-state, and
wherein said control means controls the position of the focusing means as a function of the luminosity level ratio between the luminosity level in the light-on-state, and the luminosity level in the light-off-state.

14. The image pickup apparatus according to claim 13, wherein if the luminosity level in the light-on-state is small and noisy, the luminosity level ratio is set to zero.

15. The image pickup apparatus according to claim 12, wherein said control means detects the position of said focusing means when light is illuminated on said object by said illuminating means,
wherein said control means controls the movement of the focusing means to a focusing position,
wherein the control means detects the focusing position of said focusing means when light is not illuminated on said object by said illuminating means, and wherein said control means corrects the movement of said focusing means based on the detected position.

16. The image pickup apparatus according to claim 12, wherein said control means controls the position of the focusing means based on the image taken by said imaging means.

17. The image pickup apparatus according to claim 12, wherein said control means controls the position of the focusing means based on the contrast of the image taken by said imaging means.

18. The image pickup apparatus according to claim 12, wherein said control means controls volume of emission of the illuminating means based on luminosity of the image taken by said imaging means.

19. The image pickup apparatus according to claim 12, wherein said illuminating means comprises a means for emitting laser light to said object via a diffraction grating.

20. An imaging method, comprising:
  imaging an object by transducing imaged light into electrical signals to generate an image of said object;
  controlling the illumination of supplementary light on the object; and
  controlling a position of a focusing lens as a function of a luminosity level ratio between luminosity level when the supplementary light is illuminating the object, and the luminosity level when the supplementary light is not illuminating the objects,
  wherein if the object is disposed at a location that exceeds a predetermined distance or if the object is of a reflectance below a predetermined threshold, the luminosity level ratio is set to zero.

21. The imaging method according to claim 20, further comprising:
  determining a luminosity level of said object when the supplementary light is on,
  determining a luminosity level of said object when the supplementary light is off, and
  controlling the position of the focusing lens as a function of the luminosity level ratio between the luminosity level when the supplementary light is on, and the luminosity level when the supplementary light is off.

22. The imaging method according to claim 21, wherein if the luminosity level of the object is small and noisy, the luminosity level ratio is set to zero.

23. The imaging method according to claim 20, further comprising:
  detecting the position of said focusing lens when light is illuminated on said object,
  controlling the movement of the focusing lens to a focusing position,
  detecting the focusing position of said focusing lens when light is not illuminated on said object, and
  correcting the movement of said focusing lens based on the detected position.

24. The imaging method according to claim 20, further comprising:
  controlling the position of the focusing lens based on the generated image.

25. The imaging method according to claim 20, further comprising:
  controlling the position of the focusing lens based on the contrast of the generated image.

26. The imaging method according to claim 20,
  controlling volume of emission of the supplementary light based on luminosity of the generated image.

27. The imaging method according to claim 20, further comprising:
  illuminating laser light on said object via a diffraction grating.

* * * * *